United States Patent

[11] 3,631,645

[72] Inventors Harry da Costa
Scottsdale;
Charles G. Thornton, Phoenix, both of Ariz.
[21] Appl. No. 859,133
[22] Filed Sept. 18, 1969
[45] Patented Jan. 4, 1972
[73] Assignee Motorola, Inc.
Franklin Park, Ill.

[54] METHOD FOR PROFILING BONDING NEEDLES
3 Claims, 9 Drawing Figs.
[52] U.S. Cl. .................................................. 51/326
[51] Int. Cl. .................................................. B24b 1/00
[50] Field of Search .......................................... 51/326

[56] References Cited
UNITED STATES PATENTS
3,400,448   9/1968   Helda et al. ................... 29/471.1

*Primary Examiner*—Lester M. Swingle
*Attorney*—Mueller and Aichele

ABSTRACT: In the bonding of a conductive wire to an electrical apparatus, the wire runs down through the hole in a hollow needle and extends at an angle of about 90° with the needle at the tip thereof and the wire as it exits from the needle is bonded to a bonding pad comprising part of an electrical apparatus by a combination of pressure and heat. If the inside and outside profiles of the tip of the hollow needle are not properly rounded, bad bonds will result in that the wire may break. A method and a means are disclosed for giving the tip of the needle a proper smooth and rounded profile both internally and externally.

PATENTED JAN 4 1972
3,631,645
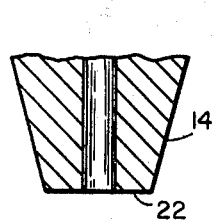
Fig. 1
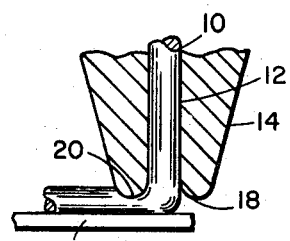
Fig. 2
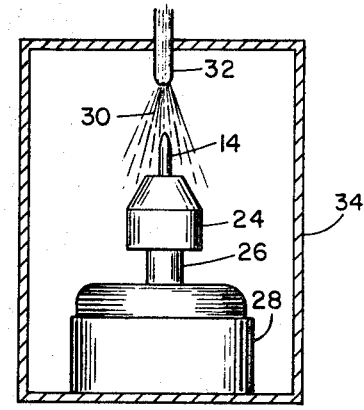
Fig. 3
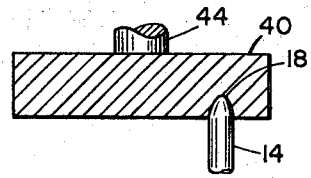
Fig. 5
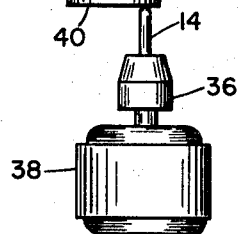
Fig. 4
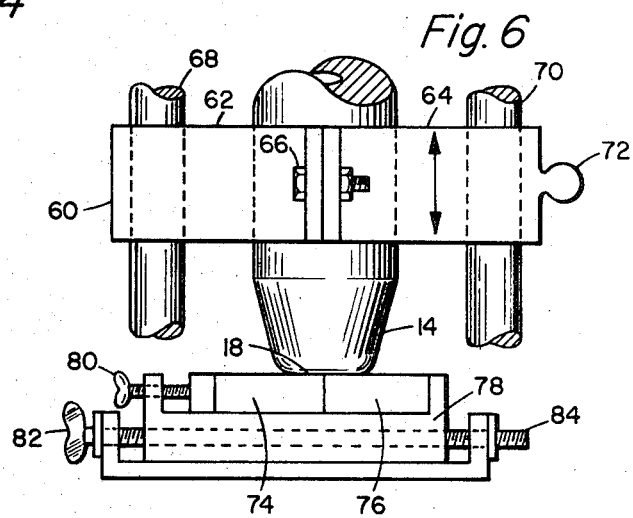
Fig. 6
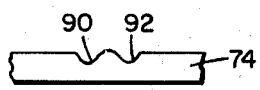
Fig. 7
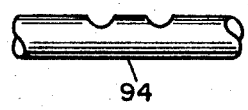
Fig. 9
Fig. 8
INVENTOR.
Harry da Costa
Charles G. Thornton
BY Mueller, Aichele & Rauner
ATTY'S

METHOD FOR PROFILING BONDING NEEDLES

BACKGROUND

This invention relates to a method for giving the tip of a hollow needle used in wire bonding a proper profile.

In making connections to electrical apparatus such as that applied to chips, a bonding wire having a diameter of a little less than 0.0015 of an inch may be used. This bonding wire is fed through a hollow needle and the portion thereof just outside the tip of the needle is bent over at about 90° to the needle. The needle is then pressed down onto a point on the bonding pad of the electrical equipment to which the wire is to be connected and the wire at the bend thereof is bonded to the electrical apparatus by a combination of pressure and heat. The needle and the apparatus are moved with respect to each other to another point where the wire is to be bonded and the bonding process is repeated. Wire is drawn down through the hollow needle during the process of moving the needle and the apparatus with respect to each other. The needle is then drawn a little further and the wire may be cut off or the wire may be broken by rapid vibration or oscillation of the needle, leaving a long enough tail of wire extending from the tip of the needle so that another bond can be made. The shape of the tip of the needle is critical since in the process of bonding due to the pressure applied thereto, a groove or indentation or impression is made in the wire during the bonding whereby the wire takes on the shape of the tip of the needle. If the tip of the needle is not properly smoothed and rounded, the wire bond may be defective in that the wire may break at the indentation when force is applied to the wire during the process of moving the needle with respect to the apparatus or during the process of intentionally cutting or breaking the wire or during any other process, such as encapsulation, that may take place. The tip of the needle is tiny, it having an outside diameter of about 0.004 of an inch and an inside diameter of about 0.0015 of an inch. The profile of the tip at the inside of the needle cannot clearly be seen by the naked eye or by the aid of optical instruments. Therefore, the only way one could be sure that a new needle had a proper tip profile was to try to make bonds with it and if the bonds made thereby were good then the needle had a proper tip profile. Furthermore, the only way that one could know that a needle was worn out was when this needle began making bad bonds. Furthermore, repairing or renewing the needle was a cut and try method whereby needles were usually discarded when they began to make bad bonds. The cost of discarded bad electrical apparatus produced by bad bonding needles and the cost of replacement of bad bonding needles added substantially to the cost of producing acceptable electrical apparatus.

It is the object of this invention to provide a method for preparing the tips of new bonding needles or for repairing the tips of worn or defective bonding needles.

It is a further object of this invention to provide a method for observing the profile of a surface which is itself difficult if not impossible to observe directly.

SUMMARY

In accordance with the invention, a hollow needle may be prepared for shaping by lapping the tip thereof to provide a tip that is perpendicular to the length of the needle. The tip of the needle is shaped by projecting particles of abrasive material towards the tip of the needle generally in directions parallel to or slightly divergent from the direction of the axis of the needle. Then the tip of the needle is polished by embedding the needle in an abrasive material and rotating the needle while so embedded. The profile of the inside and the outside of the tip of the needle is observed by making an impression of the tip of the needle on a material such as the edge of a block or such as a wire so that the shape of the needle through the center portion of the tip thereof or along the plane through the axis thereof may be observed by observing the impression made thereby.

DESCRIPTION

The invention will be better understood upon reading the following description in connection with the accompanying drawing in which FIGS. 1 and 2 are partial cross-sectional views of a needle taken at a plane through the axis thereof, FIG. 3 is an elevational view of an abrasive blasting apparatus for shaping the tip of the needle of FIG. 1, FIG. 4 is an elevational view of a polishing apparatus for polishing the tip of the needle of FIG. 1, FIG. 5 is a cross-sectional view of the abrasive pad of FIG. 4 and showing the relative position of the needle and the abrasive pad during polishing operation, FIG. 6 is an elevational view of an apparatus for making an impression of the profile of the tip of the needle preparatory to viewing it, FIG. 7 is an illustration of the profile obtained by using the apparatus of FIG. 6, FIG. 8 is a partial elevational view of a modification of the apparatus of FIG. 6, and FIG. 9 is an illustration of the profile obtained by use of the apparatus of FIG. 8.

A known method of bonding a wire 10, see FIG. 2, to a bonding pad 11 is to run the wire 10 through the hollow 12 of a hollow needle 14 and bend the wire 10 as it exits from the tip 18 of the needle 14 at a 90° angle with the length of the needle 14. The needle 14 is then pressed down on the bonding pad 11 and, by a combination of heat and pressure, the wire 10 is bonded to the bonding pad 11. Due to this pressure, an impression 20 is formed in the portion of the wire 10 that is under the tip 16 of the needle 14. Then, the needle 14 and the bonding pad 11 are moved with respect to each other until another bonding pad (not shown) is under the needle 14 and needle 14 is pressed down on the other bonding pad, whereby a connection is provided between the two bonding pads. Then the wire 10 is cut or is broken by vibrating the needle 14 and another connection may be made in a similar manner.

If the impression 20 in the wire 10 made by the needle 14 is not rounded and smoothed, that is, if the impression is jagged or angular, the wire 10 may break away from its bonding pad 11 or it may break between the two bonding pads to which it is connected during further processing of the electrical apparatus, that is, if the tip profile of the needle 14 is not smooth and rounded, the bonds made by the needle 14 may not be reliable.

The tip of the needle 14 has a diameter of about 0.004 of an inch and the inside diameter of the hole through the needle is about 0.0015 of an inch. While it is possible to see the outside profile of the tip 18 with proper optical instruments, it is not possible to see the profile of the inside portion of the tip 18 in the vicinity of the hole 12 through the needle 14. The needles 14 when bought new may therefore have a jagged or rough inside profile. Therefore, when new needles are bought they are treated as if their inside profiles are bad. They and used needles that have begun to produce bad bonds are treated alike.

New needles 14, see FIG. 1, as received, as well as used needles 14, are lapped in a known manner to produce a square tip 22. That is, after lapping, the tip 22 comprises a plane which is perpendicular to the length of the needle 14.

Then the needle 14 is put in a chuck 24 on a shaft 26 which is rotated by a motor 28 at a few hundred revolutions per minute and an abrasive material such as aluminum oxide particles 30 having diameters of from 5 to 30 microns is blown or projected directly at the tip of the needle 14 as from a nozzle 32 which is about 3 inches from the tip of the needle for from 5 to 60 seconds depending on the size of the abrasive particles. A housing 34 may be provided to prevent scattering of the abrasive particles.

After being exposed to the abrasive blast for the required length of time, the needle 14 is taken out of the chuck 24 and put into a chuck 36 which is rotated by a motor 38 at several thousand revolutions per minute. An abrasive pad 40 is provided which may be a straight grained block of wood impregnated with diamond dust, the grains of the wood pad 40 being parallel to the axis of the needle 14. Then pad 40 is fixedly mounted on a shaft 44. The shaft 44 is slideably and rotatably mounted in the bearings 46 and 48. A plate 50 is fixed to the shaft 44 between the bearings 46 and 48. A circular plate 52 is fixed to a shaft 54 which extends perpendicularly to the shaft 44. The shaft 54 is rotated in a bearing 56 at about 10 r.p.m. by a motor not shown. The circular plate 52 has a projection or lobe 58 projecting from the periphery of the plate 52. The shaft 44 and the plate 50 as well as the pad 40 slide downward with respect to the bearings 44 and 46 due to gravity until the tip 18 of the needle 14 is embedded in the stationary pad 40 as shown in FIG. 5. The periphery of the plate 52 (except for the lobe 58) does not contact the plate 50. Since the needle 14 is rotating at high speed and since the tip 18 of the needle is embedded in the straight grained pad 40, a portion of the pad 40 penetrates into the hollow 12 of the needle 14 and both the outside and the inside profile of the tip 18 of the needle 14 is polished by the pad 40. For each revolution of the shaft 54 and the plate 52, the projection 58, by its contact with the plate 50, lifts the pad 40 off of the needle 14 and rotates the pad 40 a small amount and then drops the pad 40, whereby the pad 40 presents new polishing positions to the needle 14 at periodic intervals depending on the speed of rotation of the shaft 54. After a few minutes in the polishing machine illustrated in FIGS. 4 and 5, the treatment of the tip 18 of the needle 14 is completed and the tip 18 is observed. As noted above, due to the small size of the tip 18 of the needle 14, the inside of tip 18 cannot be observed directly. An apparatus for indirectly observing the needle tip 18 is shown in FIG. 6.

The needle 14 is held in a clamp 60 comprising two parts 62 and 64 which are bolted together as by bolts and nuts 66. The needle 14 may be slid up and down on the rods 68 and 70 as by a handle 72 to cause contact of the tip 18 of the needle 14 with the junction of two soft blocks 74 and 76. The blocks 74 and 76 are held in a vise 78 by turning a thumb nut 80 and the junction of the blocks 74 and 76 can be moved to be in exact line with the axis of the needle 14 by turning the screw 84 by means of a thumb nut 82, which causes lateral motion of the vise 78. An optical instrument (not shown) may be used to help align the junction of the blocks 74 and 76 with the needle 14. When the needle 14 is pressed down, an annular groove or impression (not shown) is formed, one-half in each of the two blocks 74 and 76. Then, when the blocks 74 and 76 are removed from the clamp 78, the edge of the grooves 90 and 92 (see FIG. 7), may be examined by the eye, with the aid of an optical instrument if desired, to make sure that the grooves 90 and 92, and therefore the shape of the tip of the needle 14, are smoothly rounded off. If it appears necessary, the needle 14 may be turned 90° about its axis and another impression of the tip 18 thereof may be taken.

If desired, a wire 94 may be laid on the top of a block 96 in a groove 98 therein. The wire 94 may be fixed to a pin 100 which projects from the front of the block 96. The wire 94 may be lined up with the needle 14 (not shown in FIG. 8) by turning the screw 84 by means of the thumb nut 82. The diameter of the wire 94 is about equal to the diameter of the hole 12 in the needle 14. When the alignment of the needle 14 and the wire 94 is complete, the axis of the needle 14 and the axis of the wire 94 intersect, these axes being at right angle to each other. When the impression of the tip 18 of the needle is made into wire 94 as by the means shown in FIG. 6, the grooves or impressions in the top of the wire 94, see FIG. 9, may be examined for smoothness of curvature by any suitable optical means. If the smoothness and curvature are not suitable, the needle 14 may be reprocessed as noted above.

A method and an apparatus for shaping the outside and the inside curvature of the tip of a hollow needle which is so small in inside diameter that the inside diameter cannot be checked by known optical means has been disclosed.

We claim:

1. A method of shaping the tip of a hollow needle having an axis extending through the bottom thereof and a tip surrounding said axis which comprises lapping the tip of the needle to give it the shape of a plane perpendicular to the axis of the needle, abrading the tip of the needle with particles of abrasive material that are projected generally along the axis of the needle and into said tip, polishing said tip by rotating said needle while embedded in a straight grained pad which is impregnated with polishing materials, said grain extending parallelly to the axis of said needle, and checking the shape of the tip of said needle by forming an impression thereof in an impressionable material and observing the shape of said impression at a position corresponding to a central portion of said needle.

2. The invention of claim 1 in which said impression is formed by pressing the tip of said needle on two blocks at the junction thereof, the axis of said needle extending through the junction of said two blocks.

3. The invention of claim 1 in which said impression is formed by pressing the tip of said needle into a wire, the axis of said needle and of said wire intersecting and extending perpendicular to each other.

* * * * *